United States Patent [19]
Ream, Jr. et al.

[11] 3,811,648
[45] May 21, 1974

[54] AZIMUTH READOUT SYSTEM

[75] Inventors: Donald E. Ream, Jr., San Diego; Gregory A. Brown, Sante, both of Calif.

[73] Assignee: The United States of America as represented by the Secretary of the Navy, Washington, D.C.

[22] Filed: July 9, 1973

[21] Appl. No.: 377,500

[52] U.S. Cl. ............. 250/578, 250/209, 250/203 R, 235/92 V
[51] Int. Cl. .................................... H01j 39/12
[58] Field of Search .......... 250/234, 202, 233, 578, 250/203, 208, 209, 231 SE; 235/61.11 E, 92 V

[56] References Cited
UNITED STATES PATENTS

| | | | |
|---|---|---|---|
| 3,576,999 | 5/1971 | Blythe et al. | 250/203 R |
| 3,588,462 | 6/1971 | Kreckel et al. | 235/92 V |
| 3,602,698 | 8/1971 | Vigour | 235/92 V X |
| 3,639,766 | 2/1972 | Ogden et al. | 250/202 |
| 3,433,961 | 3/1969 | Pincus | 250/203 R |

*Primary Examiner*—Walter Stolwein
*Attorney, Agent, or Firm*—R. S. Sciascia; G. J. Rubens; T. M. Phillips

[57] ABSTRACT

A system for accurately and remotely positioning and displaying the position in azimuth of a movable instrumentation package. The package is mounted on a carriage that is driven by an electric drive motor around a circular track. A light beam directed towards two photo cells is broken by a notched metal strip as the carriage moves along the track. The pulses generated by the photo cells are counted with the counter being reset at every ten degree sector to cancel any small accumulated azimuth error.

7 Claims, 7 Drawing Figures

AZIMUTH READOUT SYSTEM

BACKGROUND OF THE INVENTION

In testing sonar system installed aboard surface ships, submarines and aircraft, an acoustic target whose position is accurately known is required. A means was needed to accurately and remotely locate, in azimuth, the position of an underwater acoustic transducer package as it is moved in a circular path underwater.

SUMMARY OF THE INVENTION

The present invention provides a positioning and indicating system that meets the above needed means by deriving raw azimuth data from two sources and processing this data in a manner to provide the exact position in azimuth with an accuracy of at least $\pm 0.1°$. The first data is derived from a photo-cell pickup unit attached to the movable carriage to provide direction and amount of movement. The second data is derived from sector switches to determine the sector in which the carriage is located and to periodically reset the azimuth measuring circuitry to cancel cumulative errors.

OBJECTS OF THE INVENTION

An object of the invention is the provision of a system for the accurately and remotely locating in azimuth, the position of a test instrument package as it is moved along a circular track.

Another object of the present invention is the provision of a system for the above-surface positioning and locating readout of underwater measurement transducers.

A further object is the provision of a digital azimuth readout and control system for a movable transducer package having an automatic digital control function, continuous readout capability while traveling in either direction, and automatic reset and error cancellation in a periodic manner.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
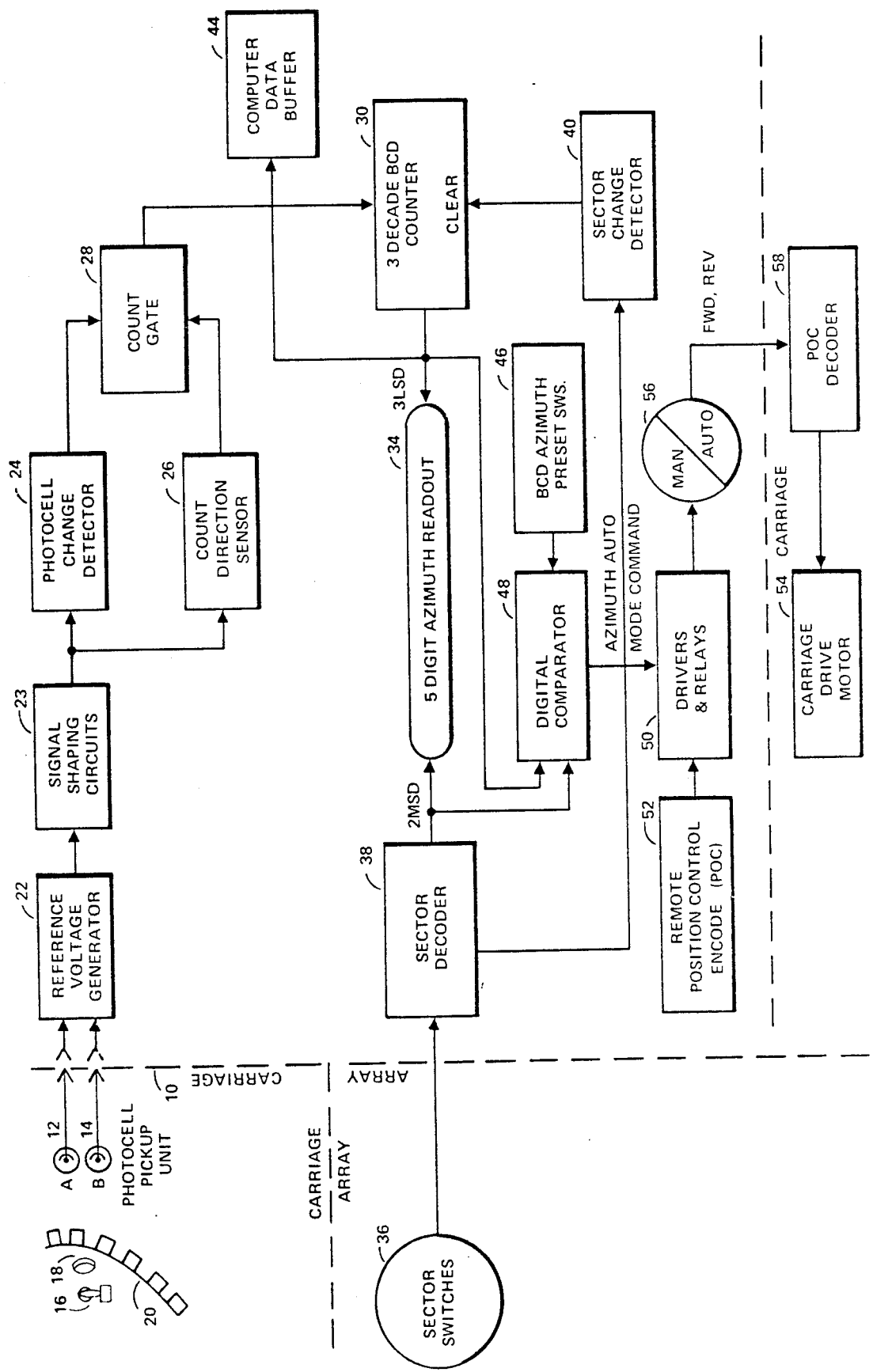
FIG. 1 is a block diagram of the system embodying the invention.

Referring now to the drawings wherein there is shown in FIG. 1 in block diagram form an azimuth position control and readout system, the raw azimuth data input to the system is derived from two sources. The first is a photocell pick unit attached to the movable carriage 10. The photocell pickup unit contains two fast response cadmium selenide photo-conductive cells 12 and 14 and a high intensity illuminating lamp 16 with a built-in lens 18 to focus the light beams onto the surfaces of the photo-cells 12 and 14. The pickup unit may be composed of an epoxy potted cube with a slot running through its center. The lamp 16 would be located on one side of the slot while the photo-cells 12 and 14 are mounted side by side on the opposite face of the slot. A tooth metal strip 20 attached to the track is centered inside the slot. As the carriage moves around the track, the light beam is alternately broken, causing the resistance of photocells 12 and 14 to alternately change.

The geometry of the pickup and the spacing of the teeth in the strip 20 are such that there are four possible combinations of output from the pickup unit. If one photocell is designated A and the other B these combinations of A and B outputs will exist as the unit moves around the track.

$A$ = A photocell not illuminated, high output resistance.

$\overline{A}$ = A photocell is illuminated, low output resistance.

$B$ = B photocell not illuminated, high output resistance.

$\overline{B}$ = B photocell is illuminated, low output resistance.

For the forward direction (increasing azimuth), the sequence of resistance outputs from A and B photocells will be $A\overline{B}$, $AB$, $\overline{A}\,\overline{B}$, $\overline{A}B$, $AB$, etc.

For the reverse direction (decreasing azimuth) the sequence of resistance outputs from the photocells will be $AB$, $A\overline{B}$, $\overline{A}\,\overline{B}$, $\overline{A}B$, $AB$, etc.

It can then be seen that the order in which the photocells are turned on and off defines which direction the carriage is moving.

By way of example, if the spacing of the teeth of the slotted track is such that four photocell output changes are obtained for every 0.04° of azimuth movement, then the instrument will have 0.01° of resolution.

Figure 2:
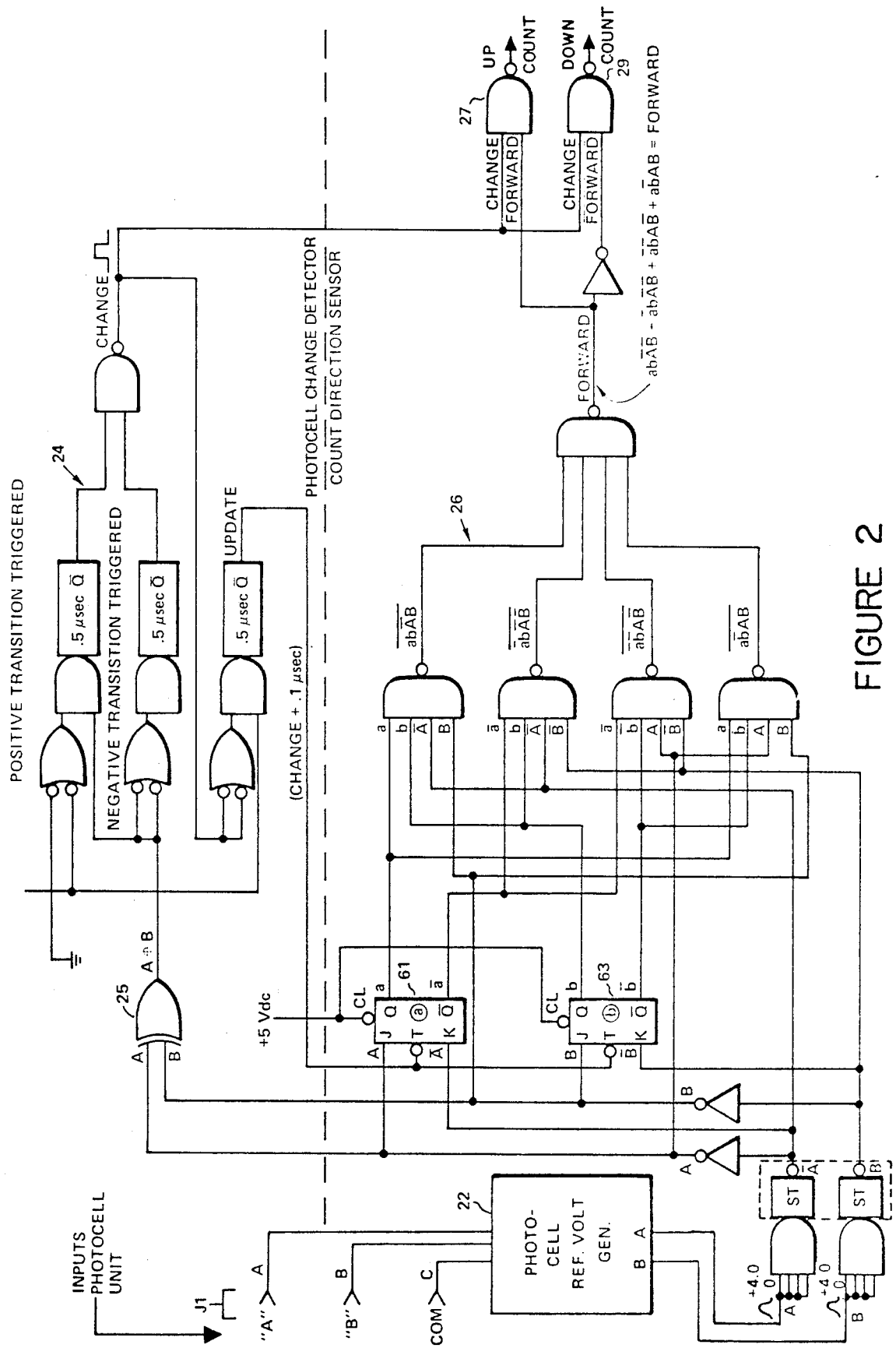
FIG. 2 is a functional logic diagram of the photocell change detector and count direction sensor of FIG. 1.

The changes in resistance of photocells 12 and 14 are converted in the well known manner into voltage signals in reference voltage generator 22. By way of example, the changing photocell resistance levels would be converted into DC voltage levels ("ON" state = 3.5 VDC: "OFF" state = 0 VDC). The voltage levels of reference voltage generator 22 are fed to a signal shaping circuit 23 where the voltage levels are transformed into TTL logic levels and shaped. Shaping circuit 23 could comprise two Schmitt triggers, one for each photocell output. The digital signals corresponding to the outputs of photocells 12 and 14 are now decoded in photocell change detector 24 and count direction sensor 26. Photocell change detector 24 detects when a change has occurred in the photocell outputs, and transmits a command pulse to count gate 28 that updates the count direction sensor input from count direction sensor 26. The output of counting gate 28 transmits a command pulse and gates the three decade binary coded decimal up-down counter 30. As shown in FIG. 2 count direction sensor 26 is so constructed that it stores the previous states of the photocells before a change has occurred. The stored information is compared with the new photocell outputs when a change occurs to determine which carriage direction sequence is occurring. After this determination is made the storage flip-flops 31 and 32 are cleared by the update pulse from the change detector 24 and the new photocell states are stored. The output of direction sensor 26 determines if the up/down counter 30 will count up (increasing azimuth; forward carriage movement) or down (decreasing azimuth; reverse carriage movement). The output from count direction sensor 26 is gated out of either gate 27 or 29 by an output pulse from change detector 24.

Figure 5A:
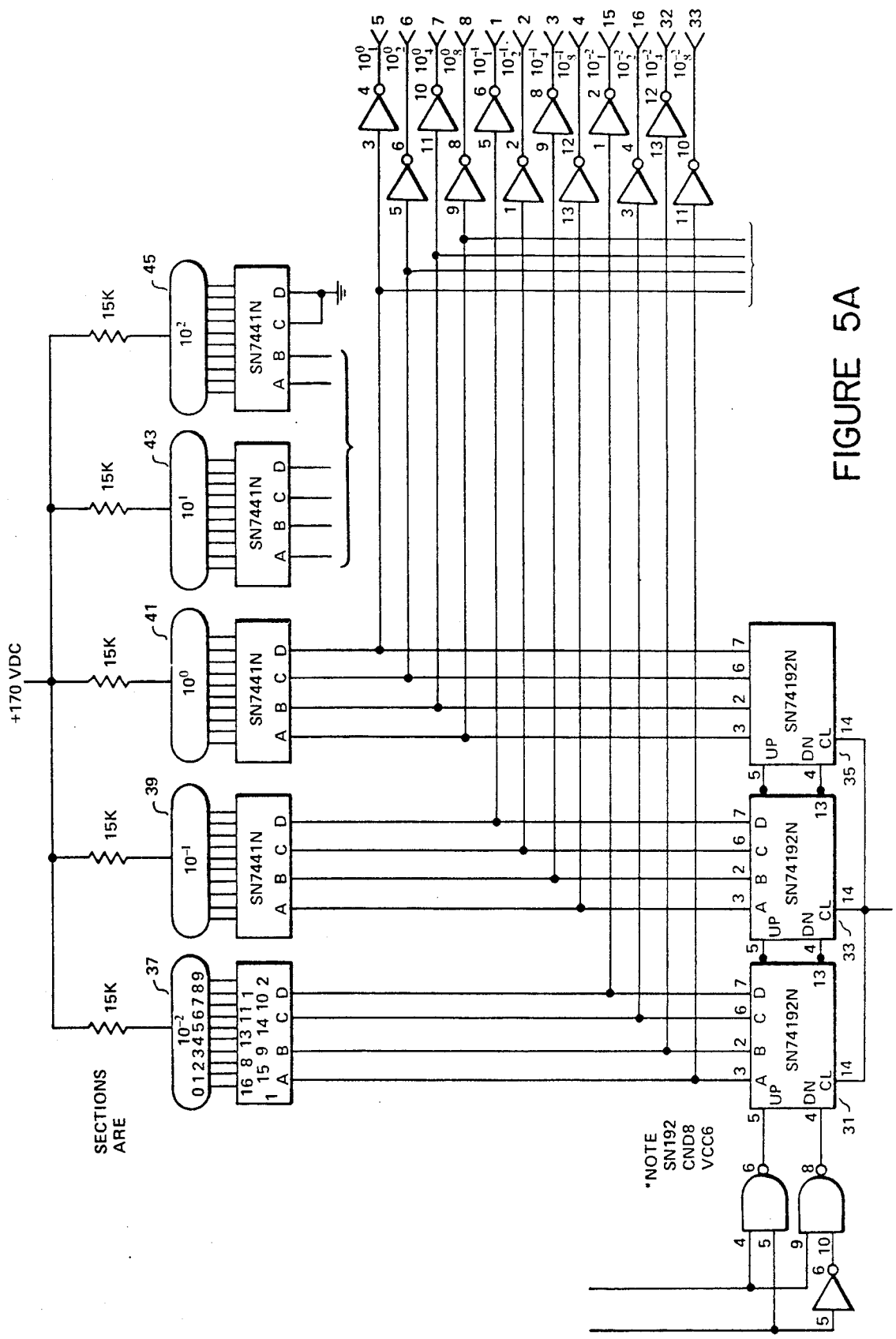
FIGS. 5A, 5B, 5C comprise a functional logic diagram of the digital azimuth readout and its associated circuitry.
Figure 5B:
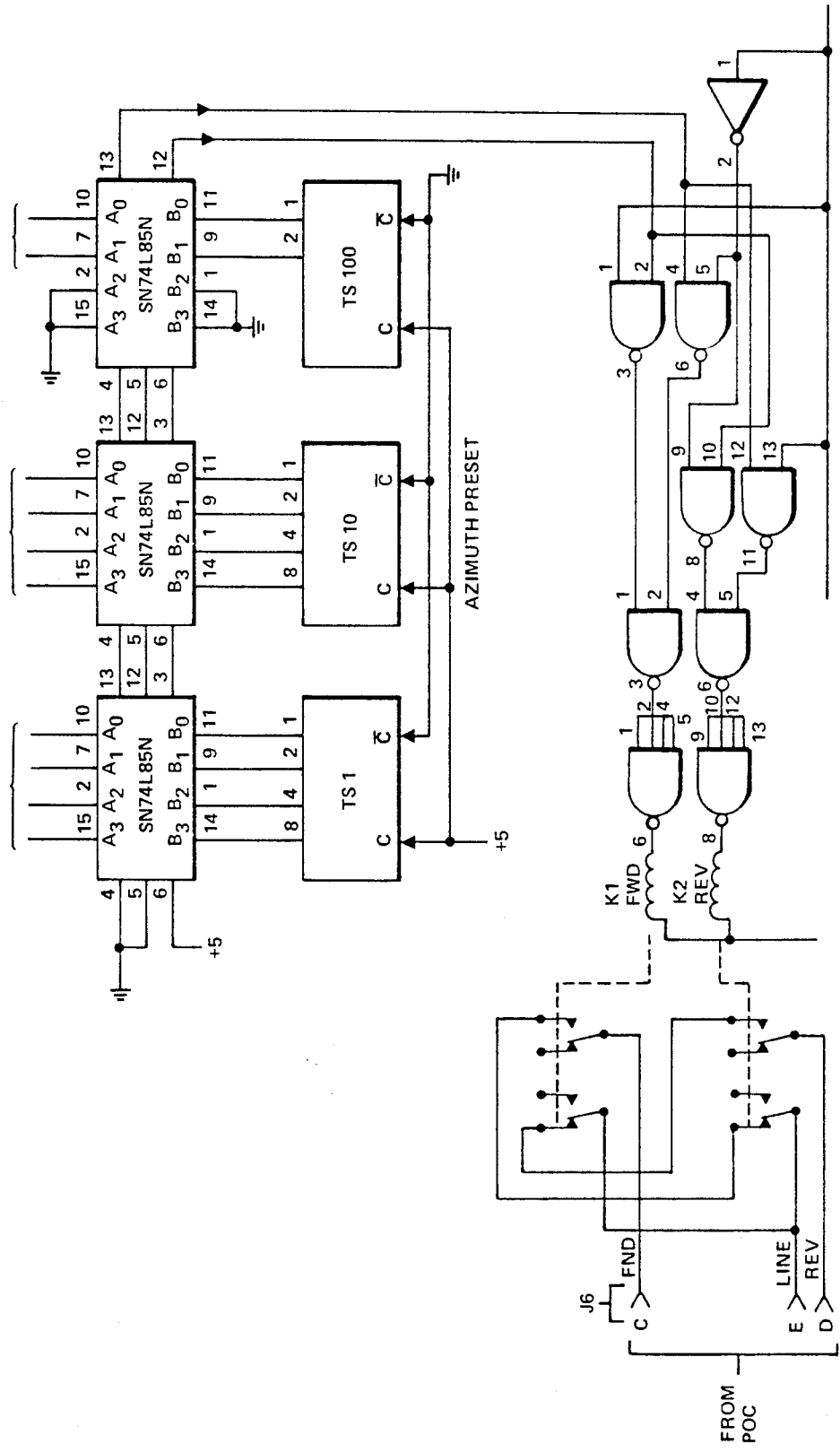
Figure 5C:
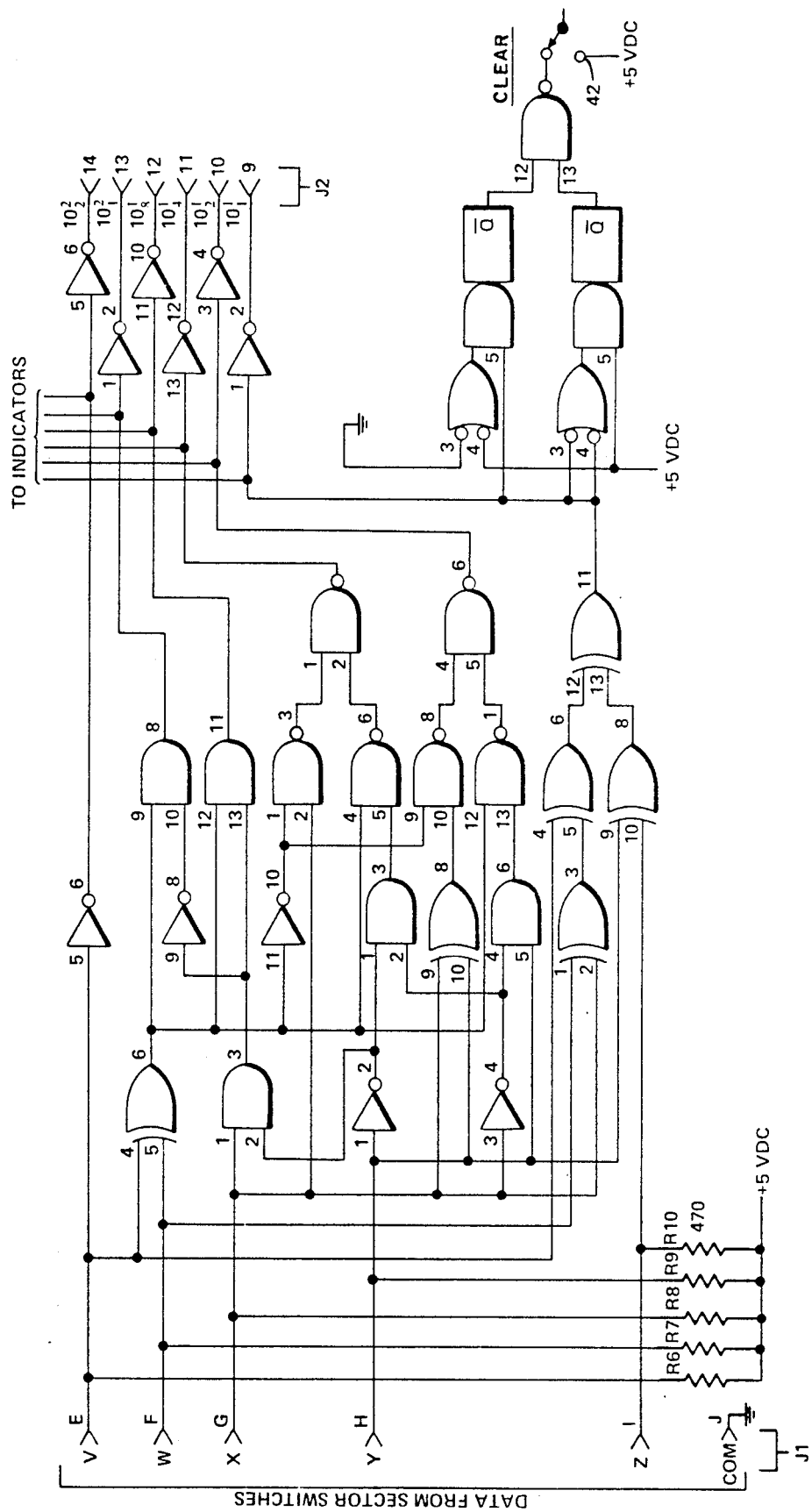

Up/down counter 30 should cover a range of 999 counts (i.e., changes of photocell outputs). Since each count is equal to 0.01° of azimuth, this corresponds to an azimuth range of 9.999 . As shown in FIG. 5A, counter 30 comprises three flip-flops 31, 33, and 35 which drive displays 37, 39 and 41 for the three least significant digits (i.e., units, tenths, and hundredths) of the five digits azimuth readout 34 (FIG. 1).

Figure 3:
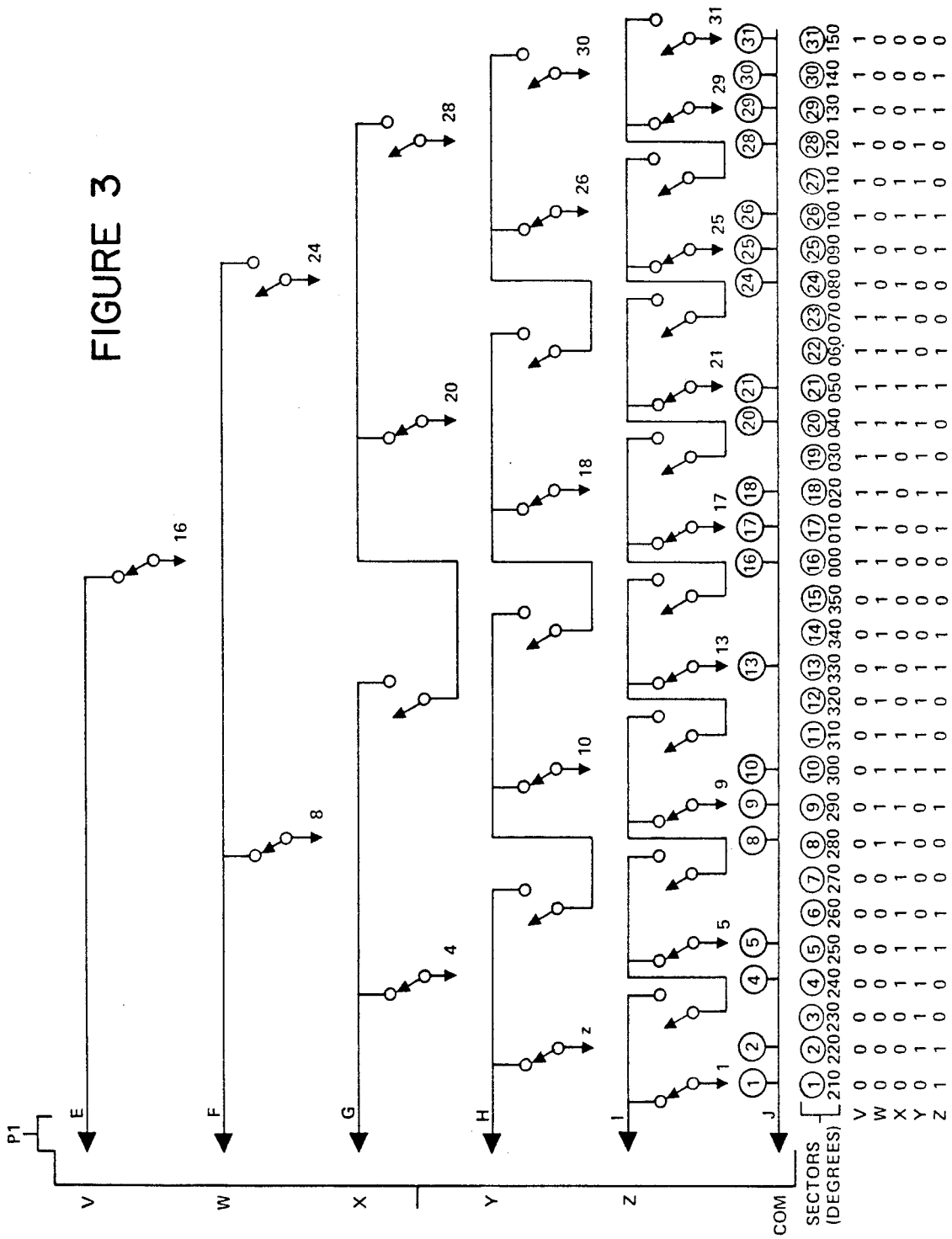
FIG. 3 shows the sector switch wiring and logic diagram of the sector switches of FIG. 1.
Figure 4:
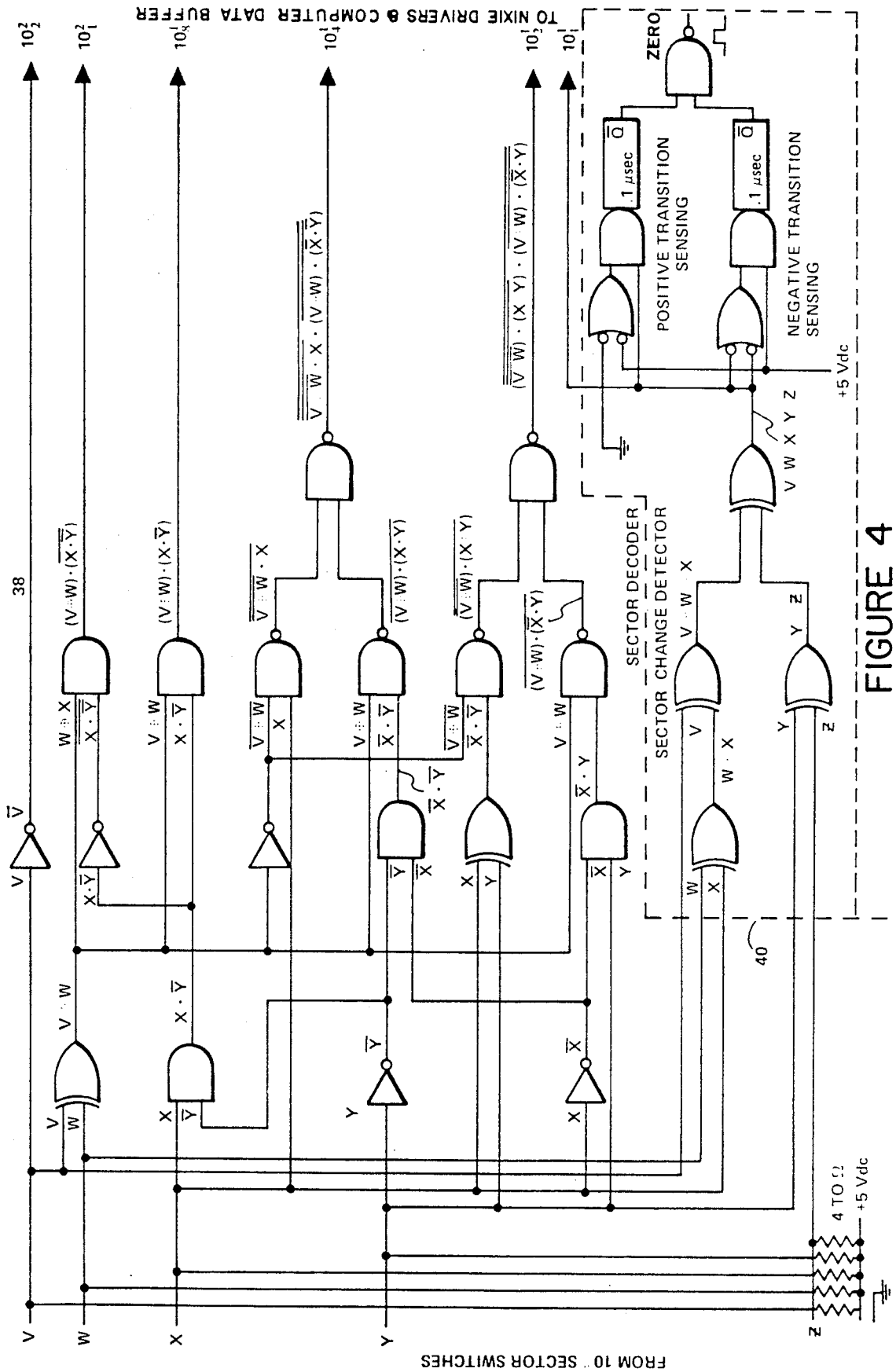
FIG. 4 shows the functional logic diagram of the sector decoder and sector change detector of FIG. 1.

The second raw azimuth data input is derived from the 10° sector switches 36 as shown in FIG. 1 and FIG. 3. There is one single throw magnetic reed switch mounted at every 10° point around the track. The carriage as it moves around the track trips a magnetic actuator located on each switch mounting plate and makes or breaks the contact and the reed switch dependent upon which direction the carriage is moving. As shown in FIG. 3 each switch is so wired as to generate a Gray coded digital word to sector decoder 38 and sector change detector 40. The switch locations should be accurately surveyed about the circular track. Each 10° position around the track has its own unique Gray coded output. The output signals according to the truth table of FIG. 3 from the sector switches are fed to decoders 38 and 40. This information is decoded and converted to the azimuth reading of the 10 degree sector in which the carriage is located. As for example and as shown in FIGS. 1 and 5A, the outputs of decoder 38 drive displays 43 and 45 which are the two most significant digits (i.e., tens and hundreds) of the azimuth readout 24 (FIG. 1). By means of switch 42 (FIG. 4) when the carriage has passed from one 10° sector to an adjacent 10° sector, a signal is fed to the three decade counter 30 (flip-flops 31, 33, 35, FIG. 2) and its associated display is cleared to 0. Counter 30 will now count up or down from the azimuth number set in by the output information from sector decoder 38.

This process repeats itself every 10° as the carriage moves forward or reverse around the circular track. This provides for self-cancelling, every 10°, of any small azimuth error that might otherwise accumulate as the carriage progresses around the track. The azimuth readout information may also be supplied to a computer data buffer 44 for use in making calculations and graphical calibration plots.

As shown in FIG. 1 the outputs of counter 30 and sector decoder 38 provide information for the remote and automatic positioning of the carriage to within 1 degree of a predetermined-azimuth location. The desired azimuth setting is set into azimuth preset switch 46. The output of preset switch 46 is compared in digital comparator 48 with the outputs of counter 30 and sector decoder 38 to provide an output signal to control relay switches 50 for selecting the appropriate command signal from remote position control encoder 52. The selected command signal is fed to drive motor 54 through selector switch 56 and position control decoder 58.

In operation and referring to FIG. 2 the output signals from photocell reference voltage generator 22 are fed to exclusive OR gate 25 of the photocell change detector circuit. If there is a change in the signal sequence from the photocells there will be an output pulse indicating a change from photocell change detector 24. This change signal pulse is fed to AND gates 27 and 29. The change pulse is also fed as an update command signal to flip-flops 61 and 63. As shown in FIG. 2 the logic circuit will gate 27 if the change is in the forward direction or will gate gate 29 if a change is in a not forward direction. The output of gates 27 and 29 are fed to flip-flops 31, 33, and 35 which make up the three decade counter 30 of FIG. 1. As shown in FIG. 5a the outputs of flip-flops 31, 33, and 35, drive the displays 37, 39, and 41 of the azimuth readout 34 of FIG. 1.

Obviously many modifications and variations of the present invention are possible in the light of the above teachings. It is therefore to be understood that within the scope of the appended claims the invention may be practiced otherwise than as specifically described.

What is claimed is:

1. A positioning and readout system for a movable instrumentation package, the combination comprising:
   a. first circuit sensing means for providing output pulses, the number of said pulses being proportional to the distance said package has moved,
   b. first circuit detector means for detecting when there is a change in the output pulses from said first sensing means,
   c. second circuit detector means for detecting the direction of the change detected by said first circuit detector means,
   d. third circuit detector means for periodically detecting when said instrumentation package has moved a predetermined increment of the total distance said package is capable of moving,
   e. decade counter means coupled to said first and third detector means and being responsive to their outputs to count said output pulses,
   f. readout circuit means coupled to said decade counter means and to said third circuit detector means for providing a readout of the position of said instrumentation package.

2. The positioning and readout system of claim 1 wherein said first circuit sensing means is two photocells positioned relative to each other to be successively interrupted for providing directional information.

3. The system of claim 2 wherein said first circuit detector means includes first and second gate circuits coupled to said photocells, said first gate circuit means being responsive to a positive transition signal from said photocells for generating an output pulse and said second gate circuit means being responsive to a negative transition signal from said photocells for generating an output pulse.

4. The system of claim 3 wherein said second circuit detector means includes storage circuit means for comparing the last output from said photocells when a change occurs with the new output and provides an output signal indicative of the sequence in which the output signals from said photocells occurred.

5. The system of claim 4 wherein said third circuit detector means includes switching means to uniformly generate a reset pulse for energy ten degree movement of said package.

6. The system of claim 5 wherein said third circuit detector means further includes a sector decoder for providing an output signal representative of the sector of a circle in which said package is positioned.

7. A positioning and readout system for a movable transducer package to be positioned on a circular track, the combination comprising:
   a. a photocell pickup unit attached to said package for providing four separate output signals,
   b. photocell change detector means coupled to said photocell pickup unit for generating an output pulse when there is a change in one of the four output signals,
   c. count direction sensor means coupled to said photocell unit for providing an output signal in response to a particular sequence of said four output signals,
   d. count gate circuit means coupled to said count direction sensor means and to said photocell change detector means for providing count up and count down output signals,
   e. three decade counter circuit means coupled to said count gate circuit means for counting the number of pulses received from said count gate circuit,
   f. visual display circuit means coupled to said three decade counter for continuously displaying the output of said decade counter,
   g. sector decoder circuit means for providing an output signal indicative of the position of said package on said circular track,
   h. sector change detector circuit means coupled to said decade counter and to said sector decoder circuit means for clearing said counter when said package moves from one ten degree sector of said circular track to another ten degree sector,
   i. automatic circuit means coupled to said three decade counter and to said sector decoder circuit means for automatically positioning said transducer package in response to a predetermined position set into said automatic circuit means.

* * * * *

UNITED STATES PATENT OFFICE
CERTIFICATE OF CORRECTION

Patent No. 3,811,648           Dated May 21, 1974

Inventor(s) Donald E. Ream, Jr.

It is certified that error appears in the above-identified patent and that said Letters Patent are hereby corrected as shown below:

Item [75], line 2, "Sante" should read -- Santee --. Column 1, last line, after "pick" insert -- up --. Column 2, line 31, "$A\bar{B}, AB, \bar{A}\,\bar{B}, \bar{A}B, AB,$" should read -- $AB, A\bar{B}, \bar{A}\cdot\bar{B}, \bar{A}B, AB,$ --; line 34, "$AB, A\bar{B}, \bar{A}\,\bar{B}, A\bar{B}, AB,$" should read -- $AB, \bar{A}B, \bar{A}\,\bar{B}, \bar{A}B, AB,$ --.

Signed and sealed this 8th day of October 1974.

(SEAL)
Attest:

McCOY M. GIBSON JR.
Attesting Officer

C. MARSHALL DANN
Commissioner of Patents